United States Patent [19]

Johnson et al.

[11] Patent Number: 5,623,696
[45] Date of Patent: Apr. 22, 1997

[54] SYSTEM FOR FORMATTING A REQUEST INTO A PACKET WHICH CAN BE READ BY PLURALITY OF OPERATING SYSTEMS FOR PROVIDING A DRIVER FOR A STORAGE DEVICE

[75] Inventors: Richard H. Johnson, San Jose, Calif.; Rosa O. Voncina, Hillsboro, Oreg.; Douglas Noddings; Christopher J. Emberley, both of San Jose, Calif.

[73] Assignee: International Business Machines Corporation, Armonk, N.Y.

[21] Appl. No.: 453,306

[22] Filed: May 30, 1995

[51] Int. Cl.⁶ .................................................... G06F 3/00
[52] U.S. Cl. ...................... 395/681; 395/500; 395/883; 395/892; 395/828; 364/280; 364/281.3; 364/927.92
[58] Field of Search ................................. 395/800, 650, 395/700, 900, 500, 828, 883, 892; 364/280, 281.3, 927.92

[56] References Cited

U.S. PATENT DOCUMENTS

| | | | |
|---|---|---|---|
| 4,485,439 | 11/1984 | Rothstein | 364/200 |
| 4,815,030 | 3/1989 | Cross et al. | 364/900 |
| 5,063,499 | 11/1991 | Garber | 395/500 |
| 5,175,856 | 12/1992 | Van Dyke et al. | 395/700 |
| 5,265,252 | 11/1993 | Rawson, III et al. | 395/700 |
| 5,289,589 | 2/1994 | Bingham et al. | 395/425 |
| 5,307,491 | 4/1994 | Feriozi et al. | 395/700 |
| 5,321,814 | 6/1994 | Barajas et al. | 395/200 |
| 5,333,246 | 7/1994 | Nagasaka | 395/133 |
| 5,333,299 | 7/1994 | Koval et al. | 395/550 |
| 5,339,434 | 8/1994 | Rusis | 395/700 |
| 5,361,336 | 11/1994 | Atchison | 395/275 |
| 5,381,274 | 1/1995 | Ueda | 360/48 |
| 5,434,805 | 7/1995 | Iwasaki | 364/580 |
| 5,459,867 | 10/1995 | Adams et al. | 395/700 |
| 5,487,167 | 1/1996 | Dinallo et al. | 395/650 |
| 5,504,920 | 4/1996 | Biggs et al. | 395/800 |

OTHER PUBLICATIONS

"IBM looks to cover C/s bases.", White, Colin, Datamation, v41, n10, Jun. 1, 1995, p. 116.

*Primary Examiner*—Thomas C. Lee
*Assistant Examiner*—Anderson I. Chen
*Attorney, Agent, or Firm*—Benman Collins & Sawyer; Esther E. Klein

[57] ABSTRACT

The present invention constructs SCSI device support code so that it can be ported to multiple operating system environments. The present invention also allows support for a device to be coded only once, and yet be supported on multiple operating system environments. Accordingly, a method and system for supporting a plurality of devices utilized with a data processing system is disclosed. This method and system allows for a plurality of devices to be utilized on a plurality of operating system platforms. The method and system comprises receiving a request from a user for a particular device, formatting the request into at least one common packet and then providing the at least one common packet to each of the plurality of operating system platforms. In so doing, any of the plurality of operating system platforms can utilize the at least one common packet to provide a device driver for the particular device. In a system in accordance with the present invention, device support code can be broken into an architected structure that allows it to execute on multiple operating system platforms and control SCSI tape, optical and medium changer devices. The code exists in a single source tree structure and can be built for execution on any of several operating system platforms by appropriate automated build procedures.

14 Claims, 6 Drawing Sheets

SYSTEM FOR FORMATTING A REQUEST INTO A PACKET WHICH CAN BE READ BY PLURALITY OF OPERATING SYSTEMS FOR PROVIDING A DRIVER FOR A STORAGE DEVICE

FIELD OF THE INVENTION

The present invention relates generally to computer peripheral device drivers and more particularly to providing such device drivers for a plurality of operating systems associated with data processing.

BACKGROUND OF THE INVENTION

Many, if not most, computer systems provide for linking a host computer operating system to one or more peripheral devices which are used as data storage media. For example, the AIX and OS/2 operating systems made by International Business Machines Corporation of Armonk, N.Y. can interface with several different types of data storage peripheral devices that have a so-called Small Computer System Interface (SCSI) interface format.

Included among SCSI devices are magnetic tape data storage devices, magnetic disk data storage devices, and optical disk data storage devices. Also included among SCSI devices are medium changer library devices, each of which contains several data storage devices. In medium changer devices, one of the data storage disks at a time can be selected and then engaged with a transport element within the device for accessing data of a storage device.

Indeed, a multiplicity of data storage devices are made by various manufacturers, each of which may transfer data in accordance with its own unique operating command sequence. It is nonetheless desirable that a host operating system be capable of communicating with as many different types of data storage devices as possible, so as not to unduly restrict the ability of the operating system to interact with available data storage devices.

Accordingly, to permit the host operating system to communicate with several different types of data storage devices, the host operating system ordinarily includes software modules referred to as device drivers. For each data storage device sought to be used by the host operating system, the host operating system must include an associated device driver which is tailored for communicating with the particular device. Thus, each device driver functions as an intermediary between the operating system and the data storage device that is associated with the device driver. More particularly, the device driver receives input/output (I/O) requests from the operating system and then issues commands to its associated data storage device to satisfy the I/O requests.

Many computer systems require device support for a large number of different peripheral devices. Oftentimes, these different devices are typically tape drives, optical devices, magnetic heads, etc. In conventional systems, a device driver must be written for each class of device. In addition, each operating system such as OS/2, UNIX, etc., will require a separate device driver for each operating system. Hence, as is seen, there can be many different device drivers written for each device type or class that is to operate with the computer system as well as for each operating system associated with each device. For example, the ADSM server requires device support for a large number of SCSI peripheral devices on several operating system platforms. Among these platforms are AIX, SUN Solaris and HP/UX. It must be economical to add new devices on all these platforms, and others in the future and it must also be economical to port the entire set of device support to a new operating system platform in the future.

Thus, for each type of data storage device sought to be used by an operating system, the operating system must include an associated device driver. It will be appreciated that each separate operating system must in turn include a plurality of device drivers that are designed for the operating system. Unfortunately, such duplication of system design effort is time-consuming and costly.

For example, it is possible to provide an individual device driver for each class of device and each operating system environment. If there are three device classes and three operating system environments, this means 9 device drivers must be written. As the number of classes and platforms grows, the number of drivers required can become very large.

Accordingly, what is needed is a system for reducing the number of drivers necessary for each operating system. In addition, what is needed is a system or method for reducing the number of device drivers required for each device. In so doing, it is important that the operating system not be substantially modified. The system and method should be one in which there is minimal additional cost to the operating system. The present invention addresses such a need.

SUMMARY OF THE INVENTION

The present invention constructs SCSI device support code so that it can be ported to multiple operating system environments. The invention also allows support for a device to be coded only once, and yet be supported on multiple operating system environments.

Accordingly, a method and system for supporting a plurality of devices utilized with a data processing system is disclosed. This method and system allows for a plurality of devices to be utilized on a plurality of operating system platforms. The method and system comprises receiving a request from a user for a particular device, formatting the request into a one or more common packets and then providing the common packet to each of the plurality of operating system platforms. In so doing, any of the plurality of operating system platforms can utilize the common packet to provide a device driver for the particular device.

In a system in accordance with the present invention, device support code can be broken into an architected structure that allows it to execute on multiple operating system platforms and control SCSI tape, optical and medium changer devices. The code exists in a single source tree structure and can be built for execution on any of several operating system platforms by appropriate automated build procedures.

DETAILED DESCRIPTION OF THE INVENTION

The present invention relates to an improvement in providing for device support for a plurality of operating systems for a computer system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
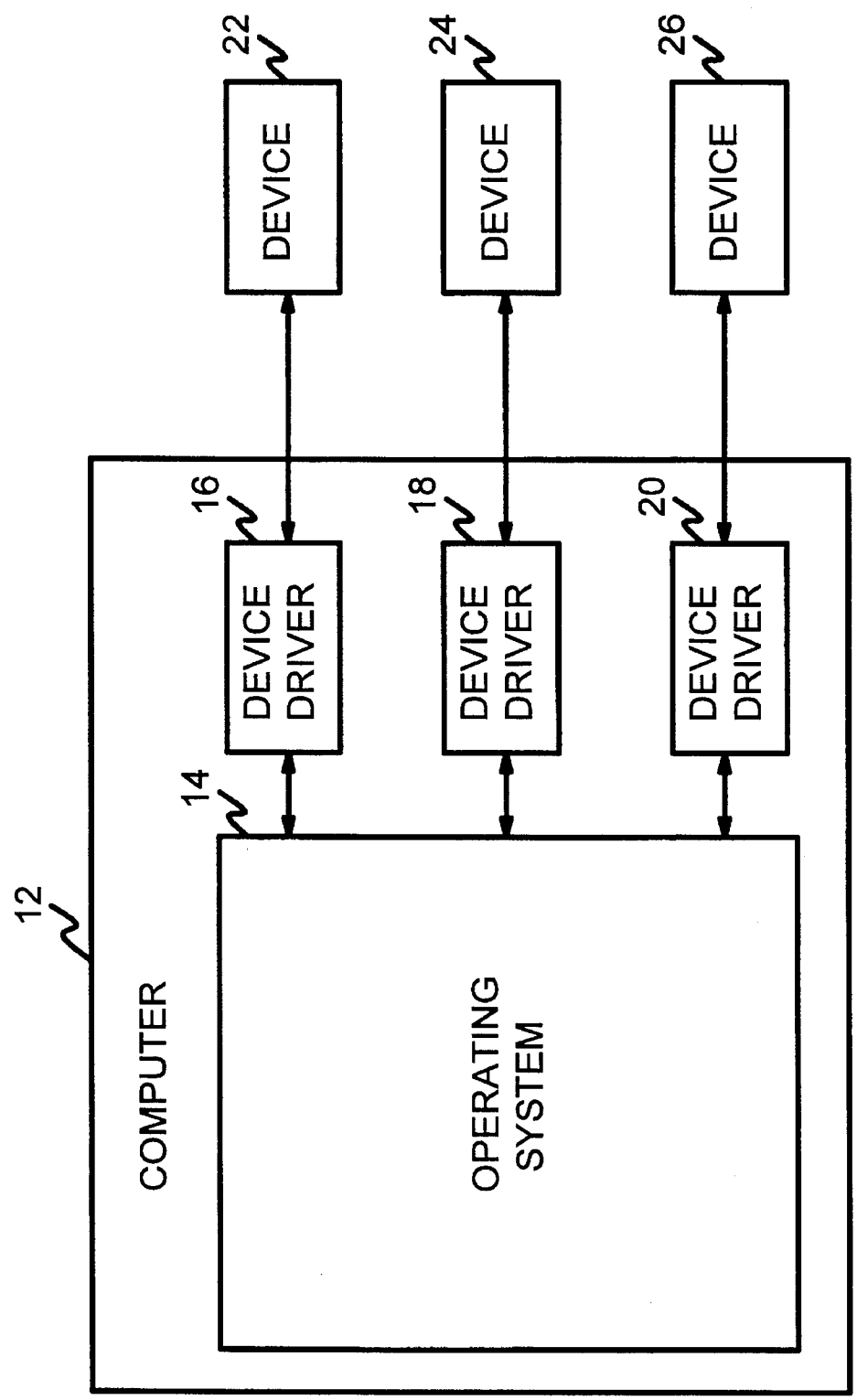
FIG. 1 is a conventional operating system environment for a device driver.

Referring initially to FIG. 1, a data transfer system is shown, generally designated 10. As shown, the system 10 includes a computer 12 with associated operating system 14. In the presently preferred embodiment, the computer 12 is a type RISC System/6000 or HP 900 or SUN computer and the operating system 14 is an AIX, HP/UX or Solaris operating system, made by International Business Machines Corporation of Armonk, N.Y.

FIG. 1 shows that the system 10 includes a plurality of computer peripheral device drivers for controlling respective data storage devices. More particularly, the system includes first, second, and third device drivers 16, 18, 20 for respectively controlling first, second, and third data storage devices 22, 24, 26. It is to be understood that the system 10 can include greater or fewer device drivers.

In accordance with principles well-known in the art, each device driver 16, 18, 20 receives data input/output (I/O) requests from the operating system 14. Further, each device driver 16, 18, 20 executes each I/O request by issuing an appropriate command sequence to its associated data storage device 22, 24, 26 to cause the device 22, 24, 26 to transfer data in accordance with the I/O request. Thus, each device driver 16, 18, 20 is an intermediary between the operating system 14 and the associated data storage device 22, 24, 26. Stated differently, each device driver 16, 18, 20 functions as a data transfer controller between the operating system 14 and the associated data storage device 22, 24, 26.

Figure 2:
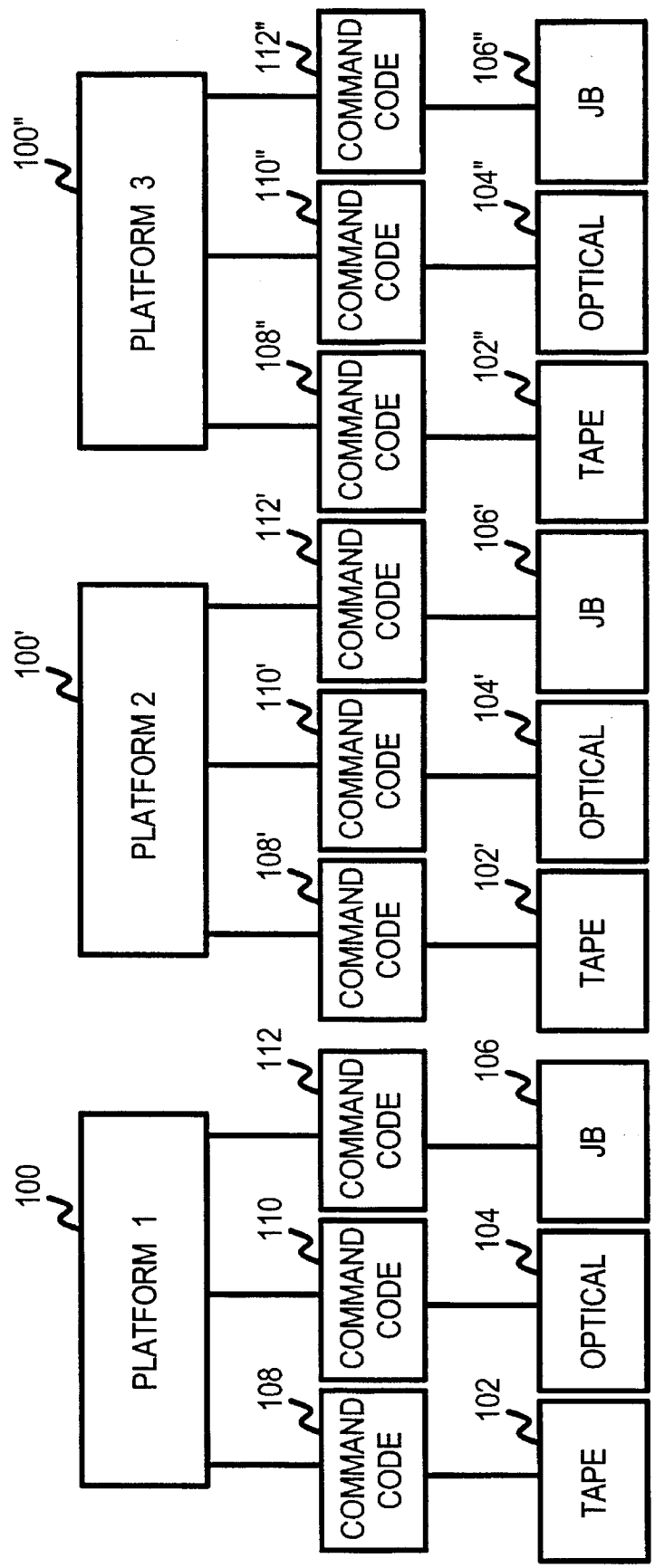
FIG. 2 is a chart showing the utilizing of device drivers over a variety of operating systems.

Referring now to FIG. 2, what is shown is a matrix of operating system platforms 100, 100' and 100'', and their associated device drivers 102–106. As is seen, there are several device drivers written for each operating system platform 100. Hence, for each operating system, separate command code 108–112, 108'–112' and 108''–112'' must be written for each device driver. Hence, even in a single operating system platform, the command codes 108–112, 108'–112' and 108''–112'' are different. In so doing, it is difficult to support a typical storage device such as a tape over a plurality of operating systems without writing a significant amount of command code for each device driver. This becomes more significant as more and more operating systems are utilized in different environments.

It should be well understood by one of ordinary skill in the art that although the above example has been shown with three operating system platforms, any number of operating system platforms could be utilized. In fact, as the number of operating system platforms increases, it is readily apparent that the amount of code that must be written for the device drivers increases exponentially.

The present invention takes advantage of the fact that much of the code between device drivers is common and that all of the operating systems do support the common SCSI command format. Hence, it is possible upon combining that commonality to substantially reduce the amount of code written for a particular device and also eliminates the need for an individual device driver written for each operating system.

In a system in accordance with the present invention, a common code device driver can support multiple classes of devices and be built for execution on various platforms. In so doing, a method and system for supporting SCSI devices over various operating system platforms is provided. This as above discussed will substantially reduce the overall amount of code that needs to be generated for each individual device and for each individual platform.

Figure 3:
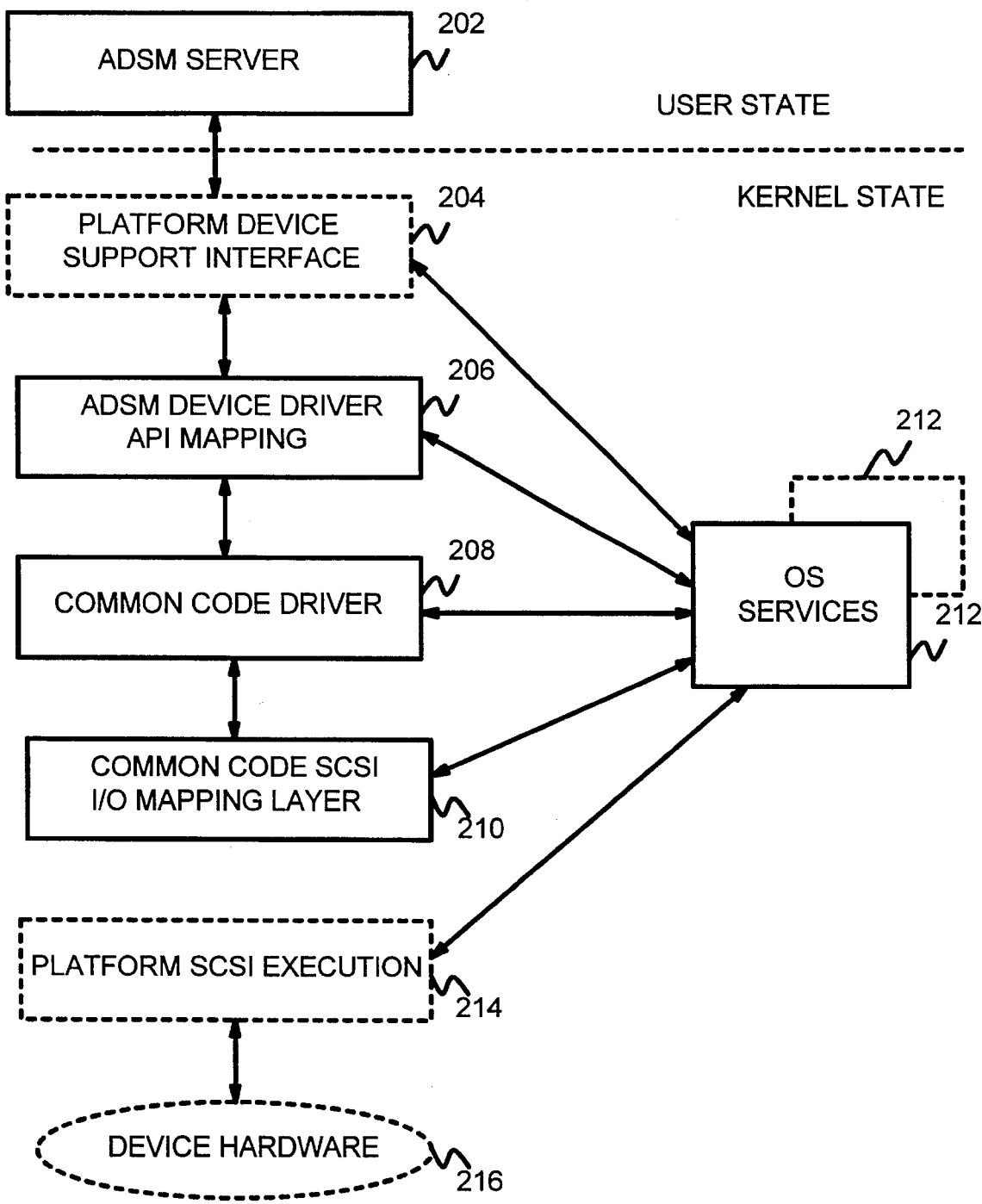
FIG. 3 is a system in accordance with the present invention for providing operating system independent SCSI device support.

To more specifically understand the present invention, refer now to the following detailed discussion in conjunction with FIG. 3, which is a block diagram of a system in accordance with the present invention.

In such a system, a server 202 provides a system call to a device support interface 204 which is specific to a specific platform. The interface 204 in turn provides that call to mapping layer 206. The mapping layer 206 with input from the plurality of operating system services 212 for a particular platform turns a request from the server 202 into a common format. Operating system services 212 for a particular operating system platform can be encapsulated in macros that expand at compile time to calls to the appropriate platform routines. These include such services as locking, error logging, pinning/unpinning memory, etc.

In a preferred embodiment, the common format would then be provided to common code driver 208. The interface 204, mapping layer 206 and common code driver are all responsive to a plurality of commands from the various operating systems. The common code driver 208 portably device types of a particular operating system as well as provided across device types of different operating systems. By utilizing this common code driver 208, individual device drivers do not have to be written for each device and also the amount of code required for each device drivers is substantially reduced for each operating system. This in turn reduces the overall design time for the support of various devices over multiple operating system platforms.

In order to allow the common code device driver 208 to support multiple classes of SCSI devices and be built for execution on various platforms, all source modules are resident in one of the following categories:

1. Modules common across all devices and platforms.
2. Modules common across all devices and all UNIX platforms.
3. Modules for device specific processing.
4. Platform specific device driver interface modules.
5. Platform specific SCSI I/O execution interface modules.

A common code SCSI I/O mapping layer 210 is provided via data from the common code driver 208 and command signals from the operating system services 212. Thereafter, platform specific (PS) SCSI execution 214 can take place. The device hardware 216 is then provided from this SCSI execution.

Through the use of this system, a common code device driver provides support for various generic I/O capabilities to SCSI devices. Accordingly, the common code device driver provides support for these generic I/O capabilities to SCSI devices:

1. device driver configuration.
2. device configuration.
3. open/close device.
4. read/write device.
5. I/O control (Special device status and control functions)

Figure 4:
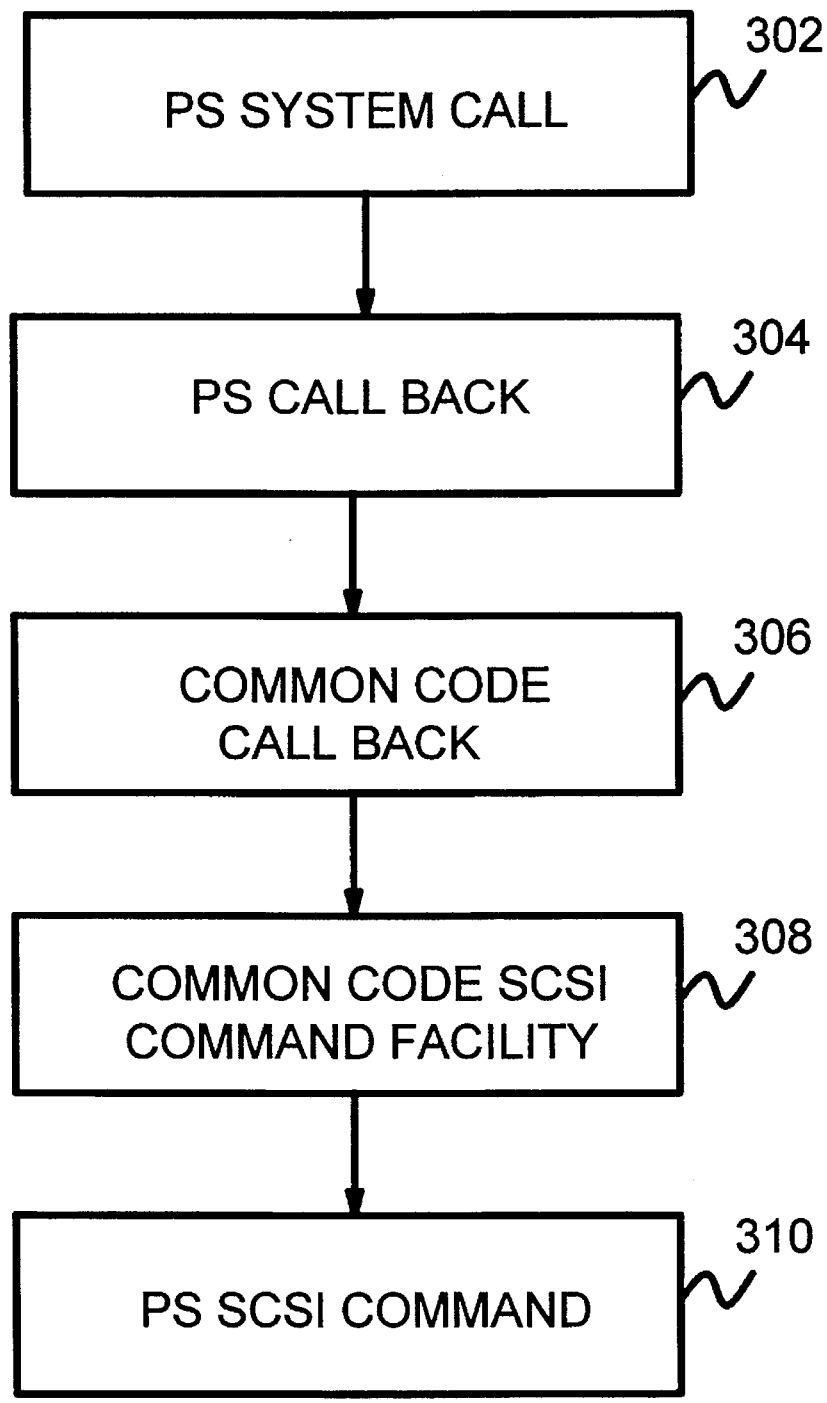
FIG. 4 is a flow chart of the operation of the system of FIG. 3.

To more clearly describe the operation of the common device driver code, refer now to a flow chart of the operation of the common code driver. Referring now to FIG. 4, what is shown is a generalized flow chart of the operation of a system in accordance with the present invention. As is seen, first a platform specific system call is made indicating that a particular operation is to occur, via step 302.

Thereafter, a platform specific call back is made to ensure that system call is proper via step 304. Next, a common code call is provided responsive to the platform specific call back, via step 306. The common code call is platform neutral. Accordingly this common code is portably provided across all platforms and device drivers.

Figure 4A:
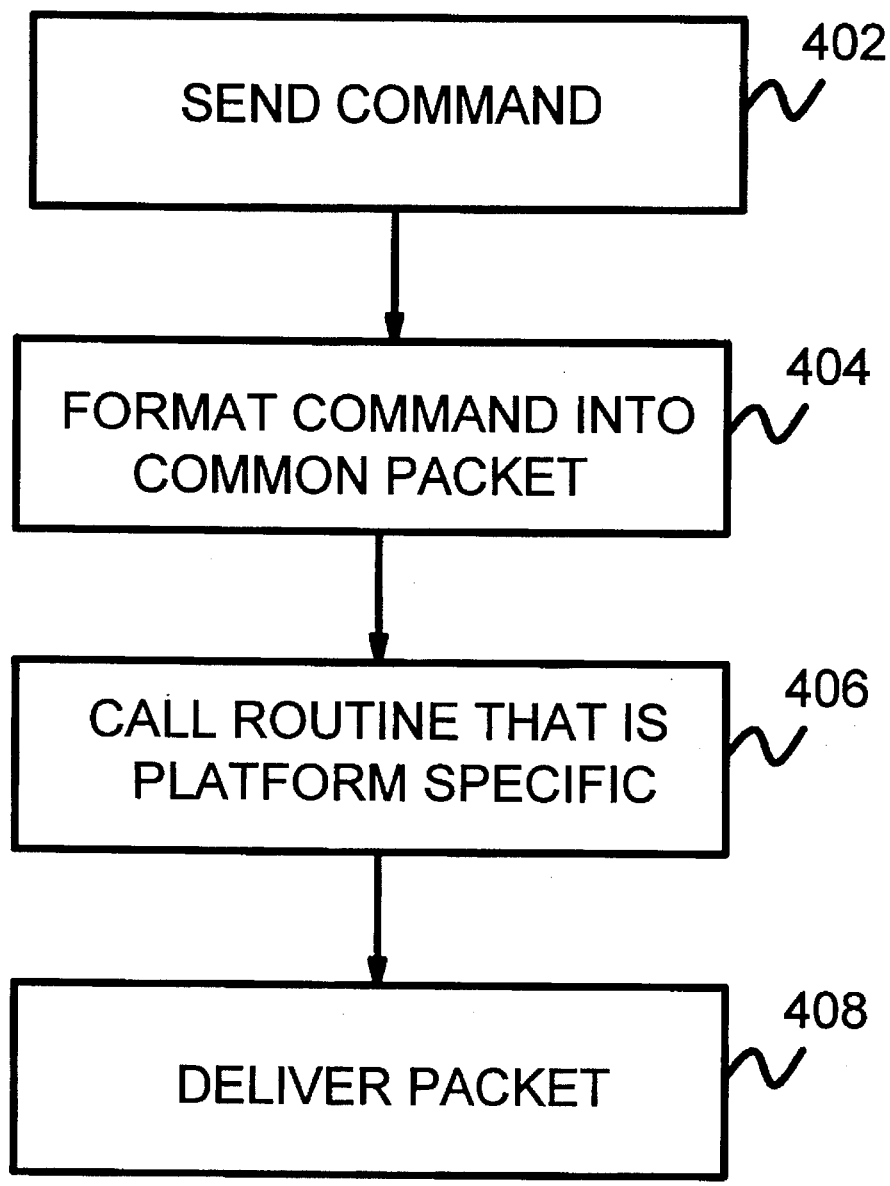
FIG. 4A is a flow chart showing the creation of a common code device driver in accordance with FIG. 4.

To more specifically describe this common code call, refer now to FIG. 4A which is a more detailed flow chart of the common code call, step 306. In this step a command is received from a platform specific routine from the operating system via step 402. This command is then acted upon which will result in the formatting of one or more SCSI packets, which can be portably provided to all of the operating systems platforms, via step 404. The portability of this common packet across multiple device drivers and multiple operating systems allows for a significant reduction in the overall design time for device drivers. Accordingly, logic, devices and code is shared across all device drivers.

Referring back to FIG. 4, after the common call back is provided via step 306, the specific routines of the operating system are not relevant. All of the device logic is independent of the operating systems. Thereafter a common code command SCSI facility is invoked via step 308. Finally, a platform specific command is invoked, via step 310 to provide the device drives for the particular SCSI device.

Figure 5:
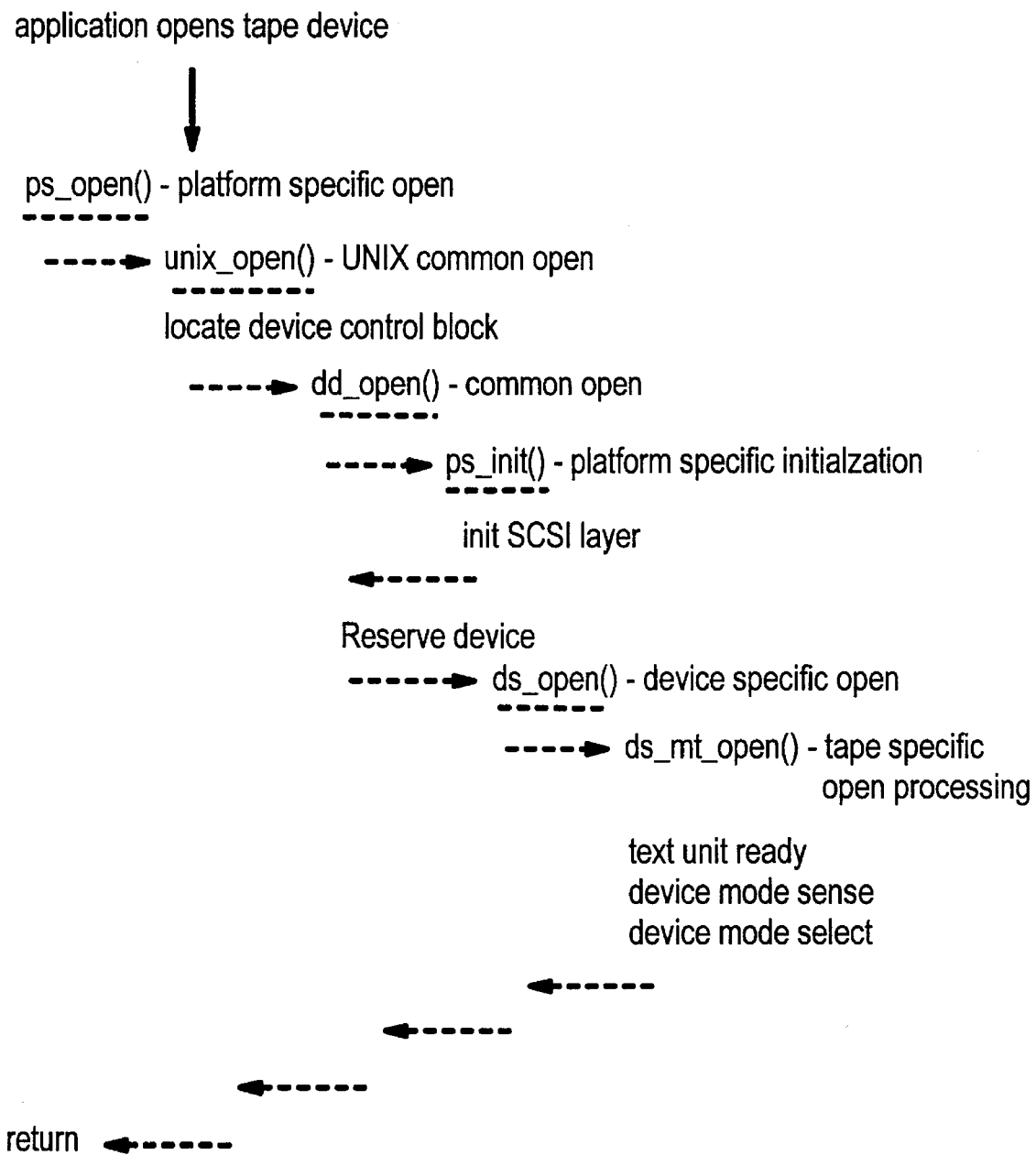
FIG. 5 is code related to a particular implementation of the flow chart of FIG. 4.

In a specific example of the above generalized flow chart of FIG. 4, FIG. 5 illustrates an abbreviated logic flow for an open operation to a tape device.

Accordingly, a system and method in accordance with the present invention has several advantages over conventional systems which are detailed below.

ADVANTAGES

A single common code device driver allows for a storage management device support interface for multiple classes of SCSI devices. The single common code device driver also provides a storage management device support interface for multiple operating system environments. Support is provided for both uni-processor and multi-processor operating system environments.

In addition, support for a new device in a device class (any of tape, optical, or autochanger) can be done by making updates to device specific tables. The tables need be modified only once for all operating system environments. The common code device driver supports both its own internal event tracing and that of the individual operating system environment. The common code device driver can be ported to a new operating system environment by creating only the platform specific source modules for that environment. The rest of the code can be used without modification. This greatly reduces development and maintenance costs.

A device driver for a given class of SCSI device and operating system environment can be built from the single source code tree using automated build tools. Selected components of the common code device driver can be built and executed as an application to facilitate debugging of new function. SCSI I/O requests for multiple classes of SCSI devices can be built and executed in a common way. Code to build and execute SCSI commands for all classes of SCSI device are done in common code and can be used in all operating system environments.

Conclusion

It is seen that with device support in accordance with the present invention, a large number of devices can be ported to a new operating system environment quickly and at a low cost. Only a single version of common device support modules needs to be maintained for many operating system environments. Product service codes and program development costs are reduced significantly.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for supporting a plurality of storage devices, utilized with a data processing system, the plurality of storage devices being utilized on a plurality of operating system platforms, the method comprising the steps:

(a) receiving a request from a user for a particular storage device;

(b) formatting the request into at least one common packet by: sending a command which indicates that the request has been received; and formatting the command into at least one packet which can be read by all of the plurality of operating system platforms, wherein the at least one common packet includes a small computer single system interface (SCSI) packet; and (c) providing the at least one common packet to each of the plurality of operating system platforms, whereby any of the plurality of operating system platforms can utilize the at least one common packet to provide a device driver for the particular storage device.

2. The method of claim 1 in which step (c) further comprises calling a routine that is specific to a particular one of the plurality of operating system platforms.

3. The method of claim 1 in which the formatting step (b2) includes providing command signals from one of the plurality of operating system platforms.

4. The method of claim 3 in which the plurality of storage devices includes a tape, optical and jukebox storage devices.

5. A method for supporting a plurality of storage devices, utilized with a data processing system, the plurality of storage devices being utilized on a plurality of operating system platforms, the method comprising the steps:

(a) receiving a request from a user for a particular storage device;

(b) sending a command which indicates that the request has been received;

(c) formatting the command into at least one small computer system interface (SCSI) packet, the at least one SCSI packet being capable of being read by all of the plurality of operating system platforms;

(d) providing the at least one SCSI packet to each of the plurality of operating system platforms; and (e) calling a routine that is specific to a particular one of the plurality of operating system platforms, whereby any of the plurality of operating system platforms can utilize the at least one SCSI packet to provide a device driver for the particular storage device.

6. The method of claim 5 in which the formatting step (c) includes providing command signals from one of the plurality of operating system platforms.

7. The method of claim 5 in which the plurality of storage devices includes a tape, optical and jukebox storage devices.

8. A system for supporting a plurality of storage devices, utilized with a data processing system, the plurality of storage devices being utilized on a plurality of operating system platforms, the system comprising:

means for receiving a request from a user for a particular storage device;

means responsive to the request receiving means for formatting the request into at least one common packet wherein the at least one common packet includes a small computer single system interface (SCSI) packet;

means for sending a command which indicates that the request has been received, the sending means being included as part of the request formatting means means responsive to the command sending means for formatting the command into at least one packet which can be read by all of the plurality of operating system platforms, this responsive means being included as part of the request formatting means; and means responsive to the formatting means for providing the at least one common packet to each of the plurality of operating system platforms, whereby any of the plurality of operating system platforms can utilize the at least one common packet to provide a device driver for the particular storage device.

9. The system of claim 8 in which further comprises means for calling a routine that is specific to a particular one of the plurality of operating system platforms.

10. The system of claim 8 in which the command formatting means includes means for providing command signals from one of the plurality of operating system platforms.

11. The system of claim 10 in which the plurality of storage devices includes a tape, optical and jukebox storage devices.

12. A system for supporting a plurality of storage devices, utilized with a data processing system, the plurality of storage devices being utilized on a plurality of operating system platforms, the system comprising:

means for receiving a request from a user for a particular storage device;

means responsive to the request receiving means for sending a command which indicates that the request has been received;

means responsive to the command sending means for formatting the command into at least one small computer system interface (SCSI) packet, the at least one SCSI packet being capable of being read by all of the plurality of operating system platforms;

means responsive to the command formatting means for providing the at least one SCSI packet to each of the plurality of operating system platforms; and means responsive to the at least one SCSI packet providing means for calling a routine that is specific to a particular one of the plurality of operating system platforms, whereby any of the plurality of operating system platforms can utilize the at least one SCSI packet to provide a device driver for the particular storage device.

13. The system of claim 12 in which the command formatting means includes means for providing command signals from one of the plurality of operating system platforms.

14. The system of claim 12 in which the plurality of storage devices includes a tape, optical and jukebox storage devices.

* * * * *